United States Patent
Misso et al.

(10) Patent No.: US 6,542,335 B1
(45) Date of Patent: Apr. 1, 2003

(54) INERTIAL SPRING LATCH ASSEMBLY AND COMPRESSIVE LIMIT STOP IN A DISC DRIVE

(75) Inventors: Nigel F. Misso, Bethany, OK (US); Steve S. Eckerd, Oklahoma City, OK (US); Roy L. Wood, Yukon, OK (US); John D. Stricklin, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/353,405

(22) Filed: Jul. 15, 1999

Related U.S. Application Data (60) Provisional application No. 60/133,834, filed on May 12, 1999.

(51) Int. Cl.[7] .................................................. G11B 5/48
(52) U.S. Cl. .................................................. 360/256.2
(58) Field of Search .......................... 360/256.2, 256.4, 360/256.5, 256.6, 265.2

(56) References Cited

U.S. PATENT DOCUMENTS

| | | | |
|---|---|---|---|
| 4,635,151 A | 1/1987 | Hazebrouck | |
| 4,890,176 A | 12/1989 | Casey et al. | |
| 4,937,692 A | 6/1990 | Okutsu | |
| 4,949,206 A | 8/1990 | Phillips et al. | |
| 5,134,608 A | 7/1992 | Strickler et al. | |
| 5,187,627 A | 2/1993 | Hickox et al. | |
| 5,224,000 A | 6/1993 | Casey et al. | |
| 5,231,556 A | 7/1993 | Blanks | |
| 5,483,399 A | * 1/1996 | Jeong et al. | 360/256.2 |
| 5,528,437 A | 6/1996 | Mastache | |
| 5,600,516 A | 2/1997 | Phillips et al. | |
| 5,612,842 A | 3/1997 | Hickox et al. | |
| 5,636,090 A | 6/1997 | Boigenzahn et al. | |
| 5,715,119 A | 2/1998 | Williams et al. | |
| 5,734,527 A | * 3/1998 | Reinhart | 360/256.2 |
| 5,812,345 A | 9/1998 | MacPherson et al. | |
| 5,905,606 A | 5/1999 | Johnson et al. | |
| 5,973,888 A | 10/1999 | Chawanya et al. | |

* cited by examiner

*Primary Examiner*—George J. Letscher
(74) *Attorney, Agent, or Firm*—Fellers, Snider, et al.

(57) ABSTRACT

An actuator latch cooperating with a magnetic assembly for latching an actuator assembly of a data storage device is provided. The magnetic assembly includes a magnet secured to one of a pair of pole pieces. The actuator latch includes a latch body adjacent the magnet assembly; a forward arm extending in a first direction from the latch body, a first ferromagnetic member supported by the forward arm disposed between the pair of pole pieces interacting with the magnet to maintain the actuator assembly in an un-latched position during operation of the data storage device; a trailing arm extending in a second direction from the latch body; and a pair of ferromagnetic members supported by the trailing arm disposed between the pair of pole pieces interacting with the magnet to secure the actuator assembly in a latched position during non-operation of the data storage device.

11 Claims, 4 Drawing Sheets

INERTIAL SPRING LATCH ASSEMBLY AND COMPRESSIVE LIMIT STOP IN A DISC DRIVE

This application claims the benefit of U.S. Pat. No. 60/133,834, filed May 12, 1999.

FIELD OF THE INVENTION

The present invention relates generally to the field of disc drive data storage devices, and more particularly but not by way of limitation, to an inertial spring latch assembly and compressive limit stop for limiting the movement of an actuator while dissipating energy from contact of the actuator with the inertial latch in a disc drive.

BACKGROUND OF THE INVENTION

Hard disc drives are used in modern computer systems to enable users to store and retrieve vast amounts of data in a fast and efficient manner. A typical disc drive is generally composed of a head/disc assembly (HDA) which houses requisite mechanical portions of the drive and a printed wiring assembly (PWA) which supports requisite electronic portions of the drive.

The HDA includes a base deck to which various components are mounted and a top cover which cooperates with the base deck to form a sealed housing to reduce particulate contamination. Within the housing, a disc stack is formed from one or more magnetic recording discs which are axially aligned for rotation by a spindle motor at a constant, high speed, such as 10,000 revolutions per minute during normal disc drive operation.

A rotary actuator assembly is mounted adjacent the disc stack and includes a plurality of rigid arms which extend into the stack between adjacent discs, as well as above and below the top and bottom discs. The rigid arms support flexible suspension assemblies which in turn, support a corresponding number of read/write heads adjacent the surfaces of the discs.

Each of the read/write heads is mounted to the rotary actuator arm and is selectively positioned by the actuator arm over a pre-selected data track of the disc to either read data from or write data to the data track. The read/write heads each include a slider assembly having an air bearing surface that, in response to air currents caused by rotation of the disc, causes the heads to fly adjacent to the disc surface with a desired gap separating the read/write head and the corresponding disc. Each head typically includes a thin-film inductive write element to write data and a magneto-resistive (MR) read element to read previously written data. The write element generally comprises a ferromagnetic core about which a conductor is wrapped multiple times to form a coil.

When the disc drive is not in use, each read/write head is brought to rest upon the adjacent disc in a parking zone where data are not stored. Typically, each read/write head is positioned adjacent the parking zone before the rotational velocity of the spinning discs decreases below a threshold velocity. Below this threshold velocity, the spinning discs are unable to sustain an air bearing sufficient to support of the read/write heads. The parking zone is typically located near the inner diameter of the discs.

Once the heads are positioned in the parking zone, it is necessary to secure the actuator assembly by a latching arrangement to prevent the read/write heads from subsequently moving out onto the data storage zone of the discs while the disc drive is non-operational. Latching arrangements are generally practiced in the art and have included various configurations of springs, solenoids and magnets to secure and release the actuator. For example, see U.S. Pat. No. 5,187,627 issued Feb. 16, 1993, to Hickox et al; U.S. Pat. No. 5,224,000 issued Jun. 29, 1993, to Casey et al; and U.S. Pat. No. 5,231,556 issued Jul. 27, 1993, to Blanks.

While operable, such prior art latching systems suffer from several limitations. Mechanical latches typically are complex while electromechanical latches require substantial electrical power to operate. Many magnetic latches with open magnetic circuits exert considerable force when the actuator is near the latch, yet still over data tracks, thus resulting in increased power consumption. Moreover, such force can limit the maximum holding force generated by the latch.

Still other prior art latches such as inertial latching mechanisms can be ineffective upon application of a mechanical shock to the system. In particular, the contact surfaces of the latch mechanism and the moving portion of the actuator are encouraged in opposing directions in response to applied mechanical shocks. Therefore, the accelerations imparted to the latching mechanism and to the moving portion of the actuator can cause the contact surfaces to meet with a greater degree of force, resulting in "bounce" at the contact surfaces which tends to overcome the latching mechanism and thereby disengage the latching mechanism.

In conjunction with providing effective latching of the actuator as the disc drive comes into the non-operational mode, it is necessary to limit the actuator movement to prevent actuator arm/gimbal assembly and disc contact since faster seek times demand increased velocity of the actuator assembly. It is necessary to precisely control the extent of actuator travel relative to the non-data zones; otherwise, an actuator that travels beyond the desired extent of radial travel likely results in damage to the read/write head. The inner extent of radial travel allows the read/write head to travel inwardly past the inner most data track to the landing zone where the read/write head can be parked on the disc surface when the disc drive is inoperable. Inward travel beyond this inner extent of travel can result in damaging contact of the read/write head with the spindle motor hub. The outer extent of radial travel allows the read/write head to access the outer most data track. Outward travel beyond this outer extent of travel can result in the read/write head moving beyond the outer edge of the data disc where there is no sustaining airflow, causing damage to the read/write heads which can contact one another or the spinning discs.

As requirements for faster data processing demand ever increasing actuator speed and associated deceleration rates during seek cycles, the likelihood of overshooting the target track increases. Such an overshoot near the extents of travel can resultingly damage the read/write heads. Also, control circuit errors are known to create "runaway" conditions of the actuator wherein the actuator fails to decelerate at the appointed time. To protect the read/write heads from catastrophic failure, it is well known and practiced in the art to employ positive stops which limit the actuator travel to locations only between the desired extents of travel.

In providing such a positive stop, or limit stop, it is necessary that the limit stop decelerate the actuator quickly and in a short distance, but without damaging the actuator assembly. Applying a general dampened braking impulse is known in the art, such as by the use of an air cylinder type dampener as taught by U.S. Pat. No. 4,937,692 issued to Okutsu. In this approach fluid is displaced by a piston that is responsive to a stop member that obstructs the movement of the actuator beyond the desired extent of travel. The dampened braking impulse provides a resistive force for decelerating the actuator, but without the typical sudden deceleration of a rigid stop member, such as a rigid stop pin.

Manufacturability and cost constraints have urged the art toward more simple mechanisms. The use of a resilient pad is widely known, such as that of the teaching of U.S. Pat. No. 4,890,176 issued to Casey et al. and assigned to the assignee of the present invention. Spring members, too, are widely used in the art, such as that according to the teaching of U.S. Pat. No. 4,635,151 issued to Hazebrouck. The primary objection to resilient pads and springs, however, is the relatively long stopping distances necessary to compress the responsive member sufficiently so as to develop an effective braking force.

One attempted solution is to provide a preload force to the resilient member, such as is taught by U.S. Pat. No. 4,949,206 issued to Phillips et al. Another approach is to provide cantilever members that elastically deflect in response to the impact force of the actuator, such as is taught by U.S. Pat. No. 5,134,608 issued to Strickler and U.S. Pat. No. 5,600,516 issued to Phillips et al. and assigned to the assignee of the present invention. Where the resilient member provides a superior initial impact response in not significantly increasing the peak deceleration rate, the relatively large amount of disc space necessarily reserved for stopping distance runs counter to the efforts in maximizing disc space utilization.

Consequently, there has not been available a latching device nor a limit stop which will universally meet the ever increasing demands of disc latching and actuator movement control in reducing the susceptibility of damage to the disc drive. It is to such ends that the present invention is directed.

SUMMARY OF THE INVENTION

The present invention relates to a disc drive having an improved inertial spring latch assembly and compressive limit stop.

As exemplified by preferred embodiments, an inertial spring latch assembly is provided for latching an actuator in a disc drive. The actuator has a coil immersed in a magnetic field established by a magnetic circuit of a voice coil motor. The inertial spring latch assembly has a latch body pivotable about a pivot axis between a latched position and an unlatched position and disposed in a gap between an upper magnet and a lower magnet. A forward arm extends from the latch body in a first direction away from the pivot axis and comprises a first ferromagnetic member which interacts with the magnetic circuit to initially attract the latch body to the latched position. A trailing arm extends from the latch body in a second direction away from the pivot axis, so that the forward arm and the trailing arm extend on opposite sides of the pivot axis. The trailing arm comprises a second and third ferromagnetic member which interact with the magnetic circuit to secure the latch body in the latched position.

A spring member extends from the latch body and comprises an actuator contact surface so that the spring member deflects to reduce the contact forces of the actuator when the actuator is brought to a latched position. In particular, the actuator contact surface of the spring member comprises a spring arm and a contact post extending therefrom to provide a low stiffness contact surface when the actuator is brought to a latched position so that the spring arm and the contact post both deflect to provide a dual spring effect.

A compressive limit stop for supporting a magnetic circuit on a base deck of a disc drive is provided. Furthermore, the compressive limit stop limits travel of the actuator pivotally supported for movement of a read/write head over a rotating disc. The compressive limit stop comprises of a rigid body disposed within the base deck which supports a top pole and a bottom pole of a magnetic circuit on the base deck. A compressive sleeve is disposed about the rigid body and deflects upon impact of the actuator so that the compressive sleeve and the rigid body act in conjunction to decelerate and thereby limit the travel of an actuator.

The advantages and features of the present invention will be apparent from the following description when read in conjunction with the drawings and appended claims.

DETAILED DESCRIPTION

Figure 1:
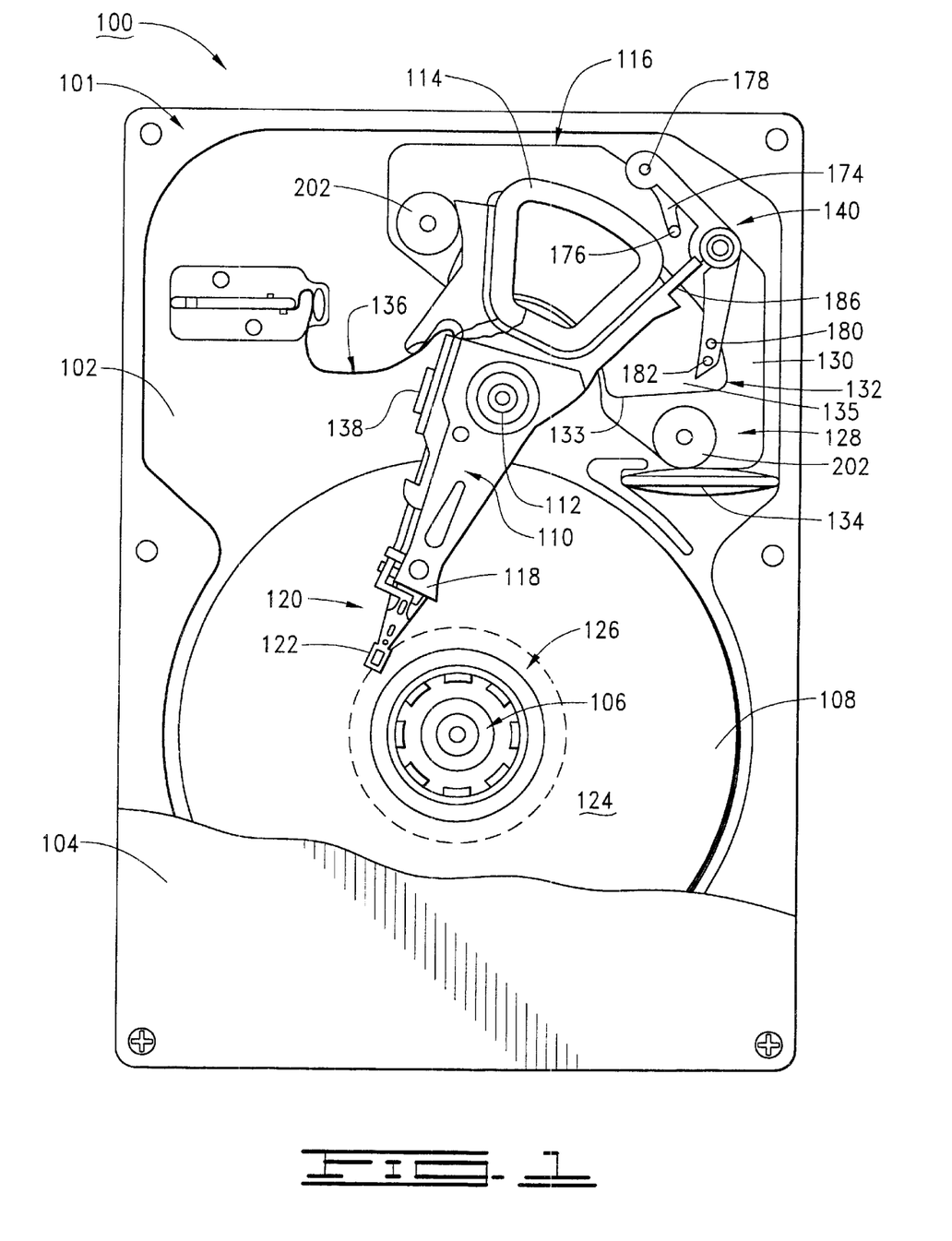
FIG. 1 is a top plan view of a disc drive constructed in accordance with preferred embodiments of the present invention.

In accordance with preferred embodiments of the present invention, reference is first made to FIG. 1 which shows a top plan view of a disc drive 100 used to store computer data. The disc drive 100 is formed of two primary assemblies: a head/disc assembly (HDA) 101, which is composed substantially of all the mechanical portions of the disc drive, and a printed wiring assembly (PWA) which supports electronics that to control the operation of the HDA. The PWA is mounted to the underside of the HDA 101 and is thus not visible in FIG. 1.

The HDA 101 includes a base deck 102 to which various disc drive components are mounted. A top cover 104, shown in partial cutaway fashion, cooperates with the base deck 102 to form a sealed housing for the HDA 101. A spindle motor 106 is provided to rotate a plurality of discs 108 at a constant high speed during normal disc drive operation. Typically, each of the discs 108 has a nominal diameter of 84 millimeters (3.3 inches), and the disc drive 100 has external dimensions which conform to what is commonly referred to in the industry as a "3½ inch" form factor.

To access the discs 108, a controllably positionable actuator assembly 110 (also referred to as an "E-block") is provided which rotates via a cartridge bearing assembly 112 in response to currents applied to an actuator coil 114 of a voice coil motor (VCM), a portion of which is shown at 116. The E-block 110 includes a plurality of actuator arms 118 (only one of which is shown) that support flexible suspension assemblies 120. The flexible suspension assemblies 120 extend to support a corresponding plurality of read/write head assemblies 122 over the discs 108. The head assemblies 122 are positionably located over data tracks (not shown) of the discs 108 in order to read data from and write data to the tracks, respectively. The head assemblies 122 are preferably characterized as magneto-resistive (MR), in that each head assembly includes a thin film inductive write element and an MR read element.

The discs 108 have a data recording location with a data recording surface 124. The data recording surface 124 is bounded at an inner extent by a circular landing zone 126 where the heads 122 can come to rest against the discs 108 at times when the disc drive 100 is not in operation.

The VCM 116 creates a magnetic field generated by a magnet assembly 128 comprising a pair of steel plates 130 (also sometimes referred to as poles 130) and permanent magnets 132. Each magnet 132 is supported by one of the poles 130.

When controlled current is passed through the actuator coil 114, an electromagnetic field is set up which interacts with the magnetic circuit of the magnet assembly 128 to cause the actuator coil 114 to move relative to the magnets 132 in accordance with the well known Lorentz relationship. As the actuator coil 114 moves, the E-block 110 pivots about the cartridge bearing assembly 112 causing the actuator arms 118 to move the read/write heads 122 adjacent to, and radially across the discs 108.

A recirculation air filter 134 filters out airborne particulate contamination as air is channeled from the rotating discs 108 to cool the actuator coil 114. A flex circuit assembly 136 facilitates electrical communication between the actuator assembly 110 and the disc drive PWA. The flex circuit assembly 136 includes a preamplifier/driver circuit 138 which applies read bias and write currents to the head assemblies 122.

Of particular interest is an inertial spring latch assembly 140 which latches the actuator assembly 110 when the disc drive 100 is deactivated so that the head assemblies 122 are brought to rest upon texturized landing zones 126 near the innermost diameters of the discs 108. The inertial spring latch assembly 140 will be described in further detail below.

Figure 2:
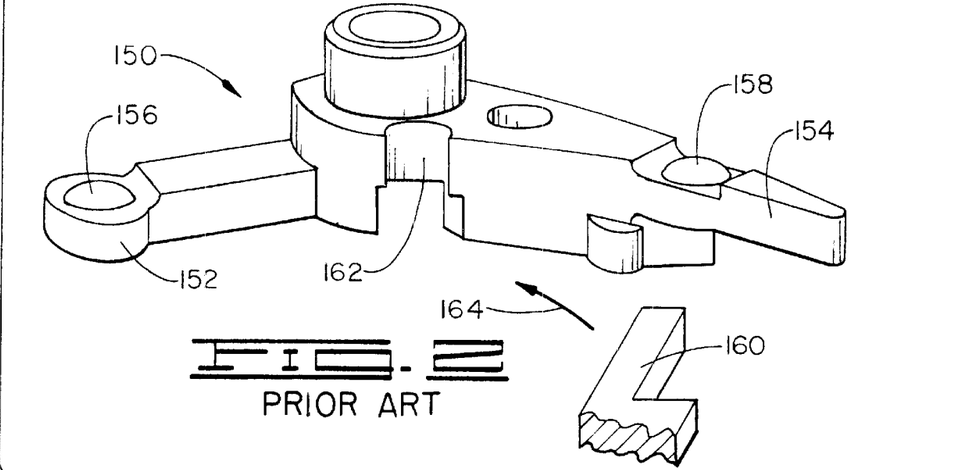
FIG. 2 is a perspective view of a prior art actuator assembly.

Referring now to FIG. 2, shown therein is a prior art actuator latch as exemplified by U.S. Pat. No. 5,734,527 issued to Reinhart. As shown, the actuator latch 150 comprises a forward arm 152 and a trailing arm 154. Magnetic members 156, 158 are attached to or molded into the forward arm 152 and the trailing arm 154, respectively. When the head assemblies (not shown) are moved to their landing zones, an actuator 160 engages with the wall of a recess 162 in the actuator latch 150, thereby urging the actuator latch 150 to its latched position. The direction of the movement of the actuator 160 is shown as line 164. The force required to latch is provided by the attraction of the magnetic member 156 to the fringe field of the VCM magnet (not shown). That is, the member 156 (not shown) is disposed proximate opposing edges of the permanent magnets (not shown) of the VCM (not shown).

To unlatch the actuator latch 150, the actuator 160 is powered to move towards the recording surfaces at the outer diameters of the discs whereby the actuator 160 engages the recess 162 which urges the actuator latch 150 to unlatch. The actuator coil (not shown) must be powered to overcome the magnetic detenting force holding the actuator latch 150 in its latched position to effectively unlatch the actuator latch 150. As the actuator is unlatched, the member 158 moves to a position proximate opposing edges of the permanent magnets of the VCM to hold the latch 150 in the unlatched position. It should be noted, however, that upon the application of a non-operational mechanical shock, the magnetic member 156 may prove insufficient in maintaining the latch in the latched position as a significant mechanical shock may overcome the magnetic attraction.

Accordingly, the present inertial spring latch assembly 140 is provided. As shown in a perspective view in FIG. 3, the inertial spring latch assembly 140 comprises a latch body 166 pivotable about a pivot axis 168. The latch body 166 has a forward arm 170 and a trailing arm 172 extending in opposite directions from the pivot axis 168. The forward arm 170 further includes a spring member 174 extending therefrom and toward the pivot axis 168. The spring member 174 includes a contact post 176 disposed at a distal end and proximate the pivot axis 168.

Figure 3:
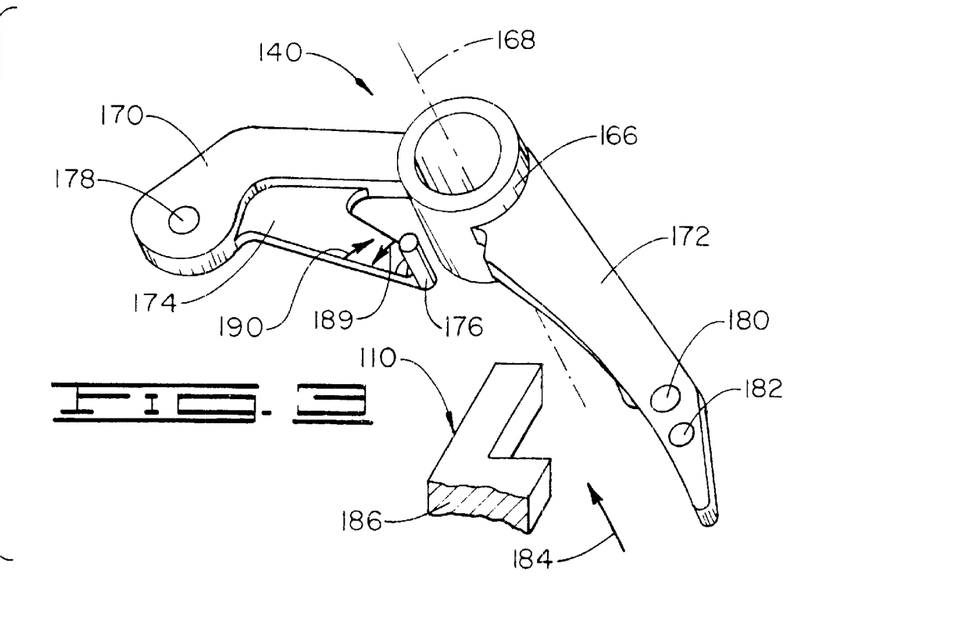
FIG. 3 is a perspective view of the inertial spring latch assembly of FIG. 1.
Figure 4:
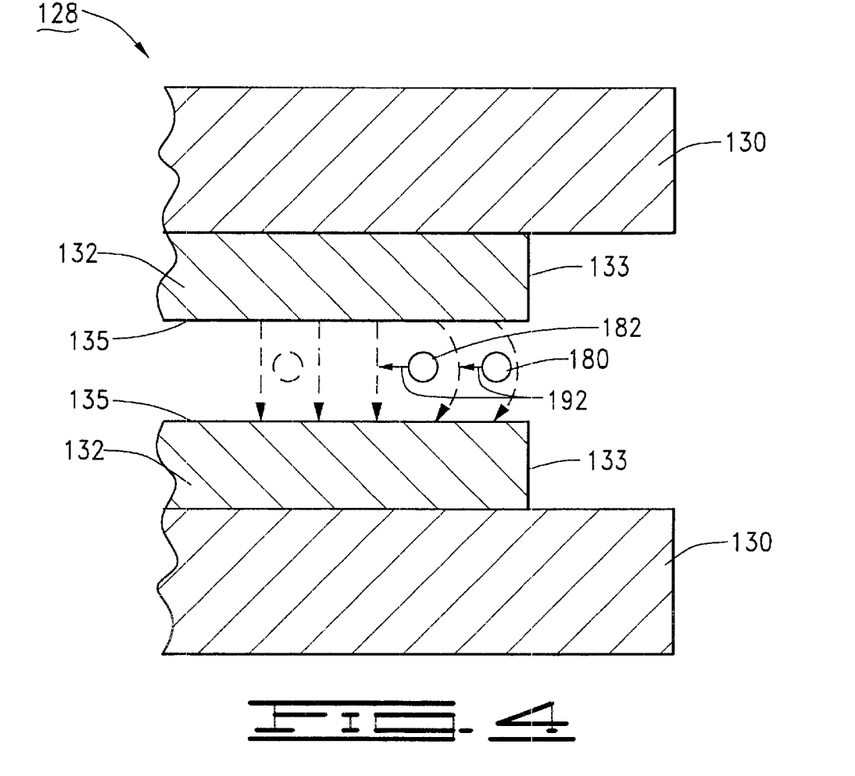
FIG. 4 is a diagrammatical view showing the effect of providing two ferromagnetic members at the trailing arm of the inertial spring latch assembly of FIG. 1.

First and second ferromagnetic members 178, 180 are disposed at a distal end of the forward arm 170 and the trailing arm 172, respectively. The trailing arm 172 further includes a third ferromagnetic member 182 disposed a radial distance from the second ferromagnetic member 180 so that both the second and third ferromagnetic members 180, 182 are disposed within the magnetic circuit of the VCM 116. The ferromagnetic members 178, 180, and 182 can take any suitable shape; in a preferred embodiment, the members comprise stainless steel ball bearings.

To facilitate discussion of the operation of the inertial spring latch assembly 140, reference is made to FIGS. 1 and 3. Although FIG. 1 shows the latch 140 in the latched position, it will be understood that during normal operation the latch 140 will be in the unlatched position. To latch the actuator assembly 110, the VCM 116 is powered to move the actuator assembly 110 from the data tracks (not shown) to the landing zone 126. As the actuator assembly 110 moves in a direction 184 toward the inner diameters of the discs 108, the first ferromagnetic member 178 provides a magnetic attraction to the magnetic field created by the magnet assembly 128.

It should be noted that a relatively high contact force results when an actuator assembly 110 contacts the actuator latch 140 as it is being latched. In the present invention, the spring member 174 effectively dampens some of the effects of the high contact force. In particular, a contact arm 186 on the actuator assembly 110 is decelerated upon engaging the contact post 176 of the spring member 174. When the contact arm 186 impacts the contact post 176, the contact post 176 and the spring member 174 deflect towards each other, as shown by arrows 189, 190, respectively to inhibit movement of the actuator assembly 110 by damping the impact of the contact arm 186 with the contact post 176. Therefore, the deflections effectively reduce the contact forces created by the deceleration of the actuator assembly 110 as the actuator assembly 110 is transitioned to its latched position. The spring effect, or deflection of both the spring member 174 and the contact post 176 thereby reduces damage to the actuator assembly 110 when it is being latched. It should also be noted that a gap exists between the contact arm 186 and the contact post 176 once the actuator assembly 110 has reached the latched position. As the actuator contact arm 186 contacts the contact post 176, the actuator assembly 110 continues to advance the read/write head 122 to a parked position with the read/write head 122 coming to rest on the landing zone 126. With the advancement of the read/write head 122 to the parked position, the actuator latch 140 rotates to bring the second and third ferromagnetic members, 180 and 182, past the edge 133 and into a position adjacent the surface 135 of the magnet 132 of the magnet assembly 128 to secure the actuator latch 140 in the latched position.

Continuing with FIGS. 1 and 3, to unlatch the actuator assembly 110, the actuator coil 114 is powered to move the actuator assembly 110 from landing zone 126 to the data regions at the outer diameters of the discs 108. The force created by powering the actuator coil 114 is calculated to be sufficient to overcome the magnetic attraction of the second and third ferromagnetic members, 180 and 182, to the magnet 132. In particular, as the actuator assembly 110 moves the read/write head 122 from the circular landing zone 126 of the discs 108 to the data recording surface 124, the second and third ferromagnetic members, 180 and 182, are simultaneously moved from a position adjacent the surface 135 through the flux field at the edge 133 of the magnet 132. Again, the flux field has its highest flux gradient at the edge 133. With the movement of the pair of ferromagnetic members, 180 and 182, beyond the reaches of the magnetic flux gradient provided by the magnet 132, the holding force provided by the magnetic flux field to retain the actuator latch 140 correspondingly diminishes. In concert with the movement of the pair of ferromagnetic members. 180 and 182, away from the retention force of the magnetic flux gradient, the first ferromagnetic member 178 of the forward arm 170 is moved into a position adjacent the edge 133 of the magnet 132 and into cooperation with the retention force of the magnetic flux gradient, to restrain the actuator latch 140 from interfering with the actuator coil 114 in order to maintain the actuator assembly 110 in an un-latched position during operation of the data storage device 100.

Figure 5:
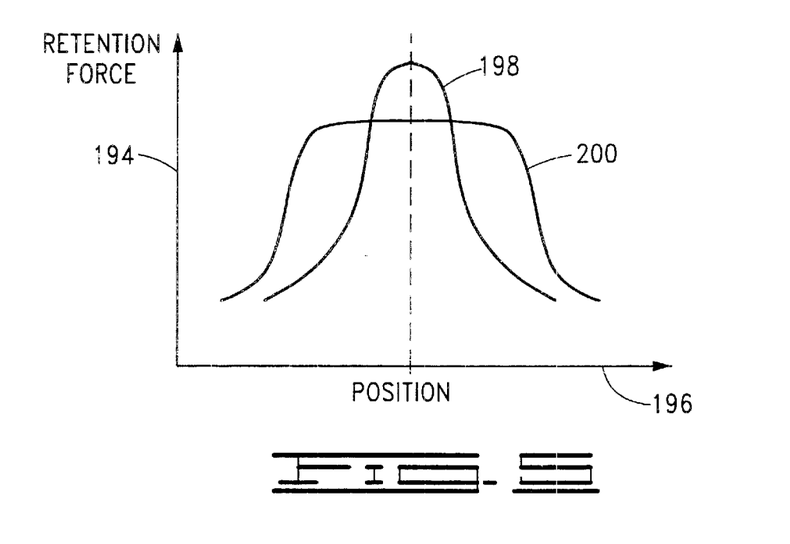
FIG. 5 is a graphical representation of the retention force in relation to the number of ferromagnetic members in the inertial spring latch assembly of FIG. 1.

To illustrate, FIG. 5 shows graphical representations of retention force (y-axis 194) versus position (x-axis 196) for a single ferromagnetic member and for two ferromagnetic members by curves 198 and 200, respectively. For reference, curve 198 represents the use of a single member as with the prior art latch 150, while the curve 200 represents the use of two members as in the inertial spring latch 140 of the present invention. Moreover, the combined mass of the two members of curve 200 equals the mass of the single member of curve 198. It is noted that the retention force is directly proportional to the mass of the ferromagnetic member. Therefore, the larger the mass of the ferromagnetic member, the greater the retention force of a latch to remain in the latched position is achieved. However, space limitations in the actuator latch inhibit the inclusion of a relatively large ferromagnetic member. Moreover, upon application of a mechanical shock upon the disc drive, a high retention force for a short period of time may be insufficient to withstand the mechanical shock.

As shown in FIG. 5, although an ultimate higher retention force is achieved by the use of a single ferromagnetic member as seen by curve 198, using two ferromagnetic members results in a larger plateau effect. In particular, curve 200 shows that the inertial spring latch 140 resists mechanical shock to remain in the latched position for a greater distance and for a longer duration of time as the inertial spring latch 140 moves from the boundary of the magnet assembly 128 wherein the largest flux gradient exists to the unlatched position reaching a uniform magnetic field. It should be noted that optimizing the location of the ferromagnetic members 180, 182 can further improve the retention force of the inertial spring latch 140.

It is advantageous to limit the pivot point of the E-block 110 so as to constrain the radial position of the head assemblies 122 to locations within the data recording surface 124. Otherwise, the head assemblies 122 can easily be damaged if they inadvertently travel off the edge of the discs 108 or into the spindle motor 106. The VCM 116 is supported on the base deck by a pair of compressive limit stops 202 (FIG. 1), as constructed in accordance with preferred embodiments of the present invention.

Figure 6:
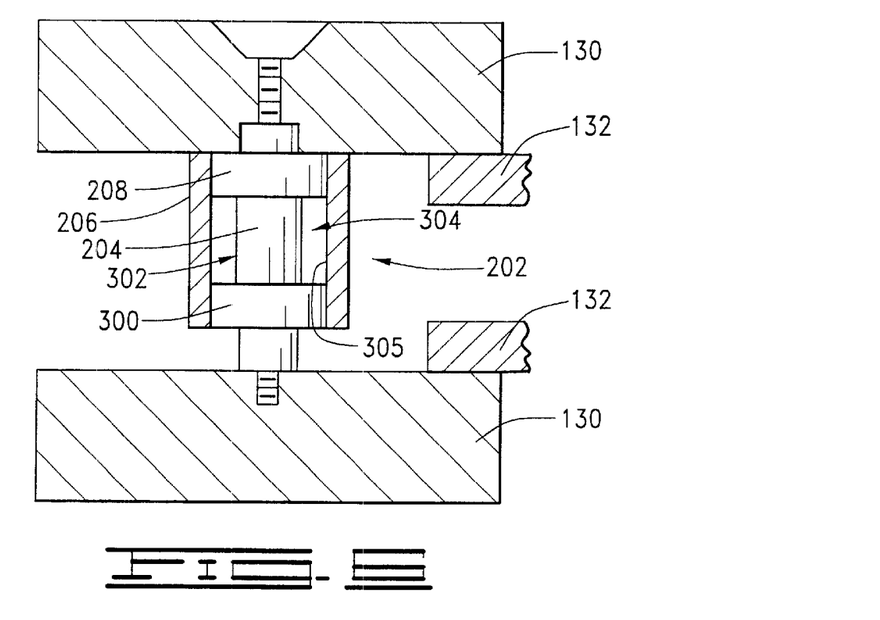
FIG. 6 is a cross-sectional elevational view of the compressive limit stop of FIG. 1.

Turning now to FIG. 6, shown therein is a partial cross-sectional, elevational view of the compressive limit stops 202 of the present invention. The compressive limit stops 202 are disposed on opposite ends of the poles 130, thereby separating the poles 130 while supporting the VCM 116. The compressive limit stops 202 each comprise of a rigid body 204 and a compressive sleeve 206 disposed thereupon. The rigid body 204 threadingly engages the base deck 102 to support the poles 130 within the HDA 101. The compressive sleeve 206 is formed from a suitable flexible and compressive material, such as polycarbonate.

The rigid body 204 further comprises top and bottom flange portions 208, 300 pressingly engaging the top and bottom pole, 130, respectively. An inner portion 302 is disposed between the top and bottom flange portions 208, 300 so that the inner portion 302 forms a groove 304 circumferentially extending about the rigid body 204.

Figure 7:
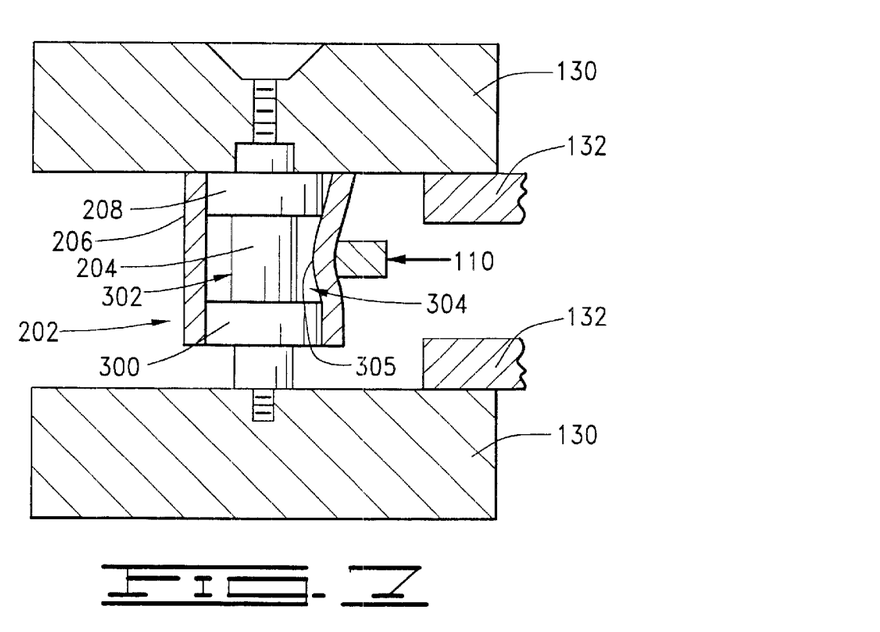
FIG. 7 is a cross-sectional elevational view of the compressive limit stop upon contact by an actuator of FIG. 1.

It is important to not decelerate an actuator too quickly when reaching a limit stop, as abruptly stopping the actuator can set up vibrations which can cause the heads to slap against the discs. Therefore, as shown in FIG. 7, as the actuator assembly 110 contacts either compressive limit stop 202, the compressive sleeve 206 deflects to decelerate the actuator assembly 110 movement to reduce the potential for damage to the actuator assembly 110. Normally, the deflection of the compressive sleeve 206 into the groove 304 will be sufficient to fully decelerate the actuator assembly 110. When the actuator assembly 110 is brought into contact with the compressive limit stops 202 at a particularly high terminal velocity, however, the compressive sleeve further advantageously operates to first deflect into the groove 304 until the compressive sleeve 206 contacts the inner portion 302, after which the compressive sleeve 206 is compressed between the actuator 110 and the inner portion 302. The deflection and compression characteristics of the compressive sleeve 206 are selected accordingly to safely decelerate the actuator assembly 110 over a desired range of possible terminal velocities, more specifically over the range of impact forces developed by the mass of the actuator assembly 110 traveling over the desired range of possible terminal velocities. Hence, the compressive limit stops 202 are disposed to assure the read/write head 122 is constrained between an inner extent and an outer extent of travel of the read/write head 122 to effectively reduce the stopping distance of the actuator assembly 110. The dual function of the compressive limit stops 202 meets the current space constraints of the data storage device 100 without adding significant mass.

In view of the foregoing, it will now be understood that the present invention is directed to an apparatus for latching the actuator and limiting the movement of the actuator. As exemplified by preferred embodiments, a disc drive 100 has an actuator assembly 110 which has a coil 114 immersed in a magnetic field established by a magnetic circuit of a voice coil motor 116. An inertial spring latch assembly 140 is provided for latching the actuator 110. The inertial spring latch assembly 140 has a latch body 166 pivotable about a pivot axis 168 between a latched position and an unlatched position and disposed in a gap between, upper and lower magnets 132. A forward arm 170 extends from the latch body 166 in a first direction away from the pivot axis 168 and comprises a first ferromagnetic member 178 which interacts with the magnetic circuit to initially attract the latch body 166 to the latched position. A trailing arm 172 extends from the latch body 166 in a second direction away from the pivot axis 168, so that the forward arm 170 and the trailing arm 172 extend on opposite sides of the pivot axis 168. The trailing arm 172 comprises second and third ferromagnetic members 180, 182 which interact with the magnetic circuit to secure the latch body 166 in the latched position. A spring member 174 extends from the latch body 166 and comprises a contact post 176, whereby the spring member 174 deflects when the actuator 110 is brought to a latched position and to dissipate kinetic energy of the actuator 110.

A compressive limit stop 202 for supporting a magnetic circuit on a base deck 102 of the disc drive 100 and limiting travel of the actuator 110 is provided. The compressive limit stop 202 comprises of a rigid body 204 disposed within the base deck 102, which supports top and bottom poles 130 of a magnetic circuit on the base deck 102. A compressive sleeve 206 is disposed about the rigid body 204 and deflects upon impact of the actuator 110 so that the compressive sleeve 206 and the rigid body 204 act in conjunction to decelerate and thereby limit the travel of an actuator 110.

It is clear that the present invention is well adapted to attain the ends and advantages mentioned as well as those inherent therein. While presently preferred embodiments of the invention have been described for purposed of the disclosure, it will be understood that numerous changes may be made which will readily suggest themselves to those of ordinary skill in the art and which are encompassed within the spirit of the invention disclosed and as defined in the appended claims.

What is claimed is:

1. An actuator latch which cooperates with a magnetic assembly to latch an actuator assembly of a data storage device, the actuator latch comprising:

a latch body adjacent the magnet assembly;

a trailing arm extending in a selected direction from the latch body and configured to move between a latched position and an unlatched position, and a pair of ferromagnetic members supported by the trailing arm and which interact with a magnetic field of the magnetic assembly to retain the trailing arm in the latched position during non-operation of the data storage device, wherein each of the pair of ferromagnetic members provides a maximum retention force at a different position of the trailing arm with respect to the magnetic assembly to provide a combined retention force which resists movement of the trailing arm to the unlatched position in response to application of a mechanical shock to the data storage device.

2. The actuator latch of claim 1, further comprising a leading arm which extends from the latch body in a second selected direction, the leading arm supporting a ferromagnetic member which interacts with the magnetic field of the magnetic assembly to retain the leading arm in a latched position when the trailing arm is in the unlatched position during operation of the data storage device.

3. The actuator latch of claim 2, in which the ferromagnetic member supported by the leading arm has a predetermined mass and wherein the pair of ferromagnetic members supported by the trailing arm have a combined mass substantially equal to the predetermined mass.

4. The actuator latch of claim 1, wherein the magnetic assembly comprises a magnet having an edge surface and a face surface, wherein the face surface is substantially perpendicular to the edge surface and in which the pair of ferromagnetic members are adjacent the face surface of the magnet when the trailing arm is in the latched position.

5. The actuator latch of claim 1, wherein the magnetic circuit comprises opposing first and second pole pieces a first magnet secured to the first pole piece and a second magnet secured to the second pole piece, and wherein the pair of ferromagnetic members are brought to a position between the first and second magnets when the trailing arm is in the latched position.

6. A data storage device comprising:

a basedeck;

a spindle motor attached to the basedeck;

a disc with a recording surface supported by the spindle motor;

an actuator assembly with an attached data transducing head, the actuator assembly adjacent the disc and secured to the basedeck;

a magnet assembly cooperating with the actuator assembly to control position of the data transducing head with respect to the recording surface the magnetic assembly having a pair of pole pieces and a magnet secured to one of the pair of pole pieces: and an actuator latch cooperating with the magnetic assembly for latching the actuator assembly, the actuator latch comprising:

a latch body adjacent the magnet assembly; and a trailing arm with a pair of ferromagnetic members at a distal end of the trailing arm, the trailing arm extending in a selected direction from the latch body, the pair of ferromagnetic members disposed between the pair of pole pieces and configured to magnetically interact with the magnet to retain the trailing arm in a latched position to secure the actuator assembly during non-operation of the data storage device, wherein each of the pair of ferromagnetic members provides a maximum retention force at a different position of the trailing arm with respect to the magnetic assembly to provide a combined retention force which resists movement of the trailing arm to the unlatched position in response to application of a mechanical shock to the data storage device.

7. The data storage device of claim 6, further comprising a leading arm which extends from the latch body in a second selected direction, the leading arm supporting a ferromagnetic member which interacts with the magnet to retain the leading arm in a latched position when the trailing arm is in the unlatched position during operation of the data storage device.

8. The data storage device of claim 7, in which the ferromagnetic member supported by the leading arm has a predetermined mass and wherein the pair of ferromagnetic members supported by the trailing arm have a combined mass substantially equal to the predetermined mass.

9. The data storage device of claim 6, wherein the magnetic assembly comprises a magnet having an edge surface and a face surface, wherein the face surface is substantially perpendicular to the edge surface and in which the pair of ferromagnetic members are adjacent the face surface of the magnet when the trailing arm is in the latched position.

10. The data storage device of claim 6, in which the magnet is characterized as a first magnet, in which the magnetic circuit further comprises a second magnet secured to the remaining one of the pole pieces, and in which the pair of ferromagnetic members are brought to a position between the first and second magnets when the trailing arm is in the latched position.

11. A data storage device comprising:

a basedeck;

a spindle motor attached to the basedeck;

a disc with a recording surface supported by the spindle motor:

an actuator assembly with an attached read/write head the actuator assembly adjacent the disc and secured to the basedeck;

a magnetic assembly supported by the basedeck providing a magnetic field which interacts with the actuator assembly to position-control the data transducing head, the magnetic assembly comprising, a pair of pole pieces with a magnet secured to one of the pair of pole pieces; and means for latching the actuator assembly in a latched position by concurrently generating multiple retention forces each having a maximum magnitude at a different distance from the magnetic assembly, said multiple retention forces cooperating to form a combined retention force which resists movement of the actuator assembly away from the latched position in response to application of a mechanical shock.

* * * * *